Figures 1, 2:
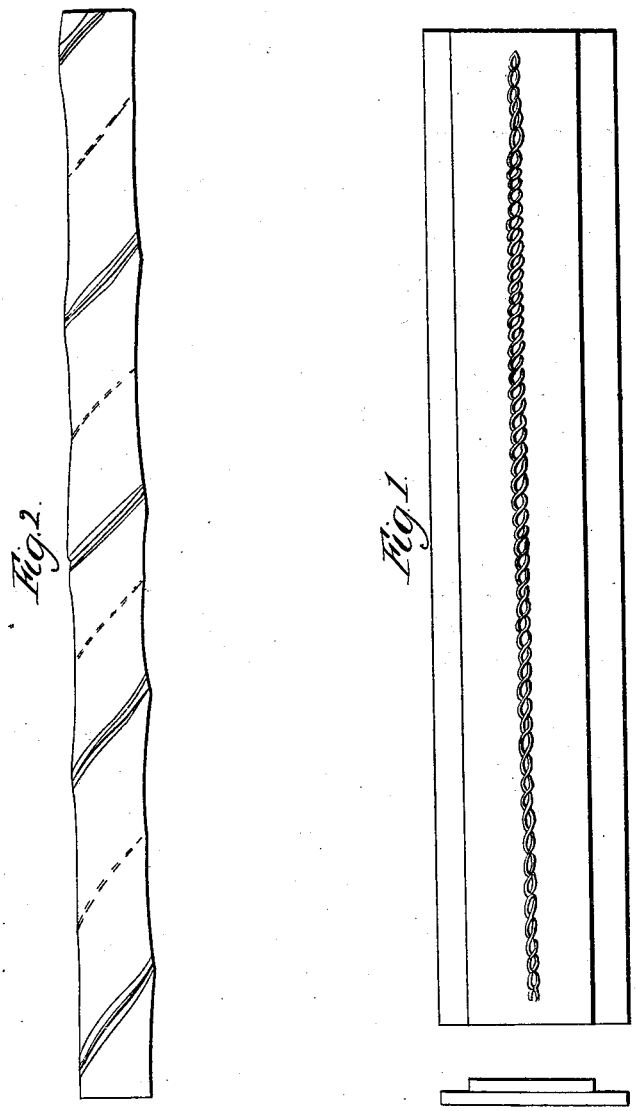

M. Jewell,
Machine Belting,
Nº 20,564. Patented June 15, 1858.

UNITED STATES PATENT OFFICE.

M. JEWELL, OF HARTFORD, CONNECTICUT.

MANUFACTURE OF ROUND BELTING.

Specification of Letters Patent No. 20,564, dated June 15, 1858.

*To all whom it may concern:*

Be it known that I, MARSHALL JEWELL, of Hartford, county of Hartford, and State of Connecticut, have invented certain new and useful Improvements in Manufacturing Round Belting; and I do hereby declare that the same is described and represented in the following specification and drawings, and to enable others skilled in the art to make and use it I will proceed to describe the construction, referring to the drawings, in which the same letters indicate like parts in each of the figures.

The nature of this improvement will readily be understood from the drawings, and description herewith.

Figures 1 and 2 of the accompanying drawings represent my improvement in the mode of manufacturing round belting, as differing from all others now or heretofore in use.

Fig. 1 shows two pieces of leather, one a little broader than the other and put together so that one piece shall lap over the joint of the other and sewed through the center, one or more rows of stitches. By having one piece a little wider than the other I am enabled to wind or twist it more closely together into a round, even surface as shown in Fig. 2; also it will fit or adhere and run more freely over the groove pulley, and is more impervious to water, or the effects of dampness. The various sizes are produced by the thickness of the leather, and the more or less thicknesses, put together in the same manner as above described.

Different sizes of round belting have been made by putting together sufficient thicknesses for a given size, and drawn through a die which forms it into the required shape, and in running over the pulley, the outside thickness must yield more than the inside thickness, and the tendency is to separate the one from the other without the effects of water or dampness, but when exposed to them is much more so, and soon becomes entirely useless; hence the experiments to produce a more substantial and durable article.

What I claim and desire to secure by Letters Patent is—

A new manufacture, of round leather belting composed of two or more thicknesses, stitched and twisted, as shown in Figs. 1 and 2, in the manner and for the purpose as herein set forth and described.

MARSHALL JEWELL. [L. S.]

Witnesses:
J. E. COLEMAN,
JEREMY W. BLISS.